United States Patent [19]

Datta et al.

[11] Patent Number: 4,722,971

[45] Date of Patent: Feb. 2, 1988

[54] EASY PROCESSING ETHYLENE PROPYLENE ELASTOMERS

[75] Inventors: Sudhin Datta, Scotch Plains; Edward N. Kresge, Watchung, both of N.J.

[73] Assignee: Exxon Chemical Patents Inc., Linden, N.J.

[21] Appl. No.: 18,198

[22] Filed: Feb. 24, 1987

Related U.S. Application Data

[63] Continuation of Ser. No. 762,056, Aug. 2, 1985, abandoned.

[51] Int. Cl.$^4$ .............................................. C08L 23/16
[52] U.S. Cl. .................................. 525/211; 525/240; 526/65; 526/66
[58] Field of Search ................. 525/240, 211

[56] References Cited

U.S. PATENT DOCUMENTS

| | | | |
|---|---|---|---|
| 3,468,979 | 9/1969 | Hamed et al. | 525/211 |
| 3,681,306 | 8/1972 | Wehner | 526/282 |
| 3,884,993 | 5/1975 | Gros et al. | 260/897 A |
| 4,078,131 | 3/1978 | Zarauz | 525/237 |
| 4,259,468 | 3/1981 | Kajiura et al. | 526/282 |
| 4,306,041 | 12/1981 | Cozewith et al. | 526/282 |

FOREIGN PATENT DOCUMENTS 0059034 1/1982 European Pat. Off. .

*Primary Examiner*—Carman J. Seccuro
*Attorney, Agent, or Firm*—S. H. Markowitz; J. B. Murray, Jr.

[57] ABSTRACT

By selecting the composition and intermolecular compositional distribution with respect to ethylene and diene content and the molecular weight and molecular weight distribution, ethylene-propylene-diene terpolymers can have both improved processing properties and compound vulcanizate physical properties. The lower molecular weight fractions of $10^4$ to about $5 \times 10^5$ have at least 2 times the diene content of the higher molecular weight fractions and an ethylene content of 30–80 wt. %. The higher molecular weight fractions of $2 \times 10^5$ to about $10^7$ have a higher ethylene content than the lower molecular weight fractions and are less than 90 wt. % ethylene.

16 Claims, No Drawings

EASY PROCESSING ETHYLENE PROPYLENE ELASTOMERS

This is a continuation of application Ser. No. 762,056, filed Aug. 2, 1985, now abandoned.

BACKGROUND OF THE INVENTION

The usefulness of ethylene propylene diene terpolymers (EPDM) polymers depends on the cure rate and cure state as well as ease of fabrication. Fabrication describes the collection of polymer properties which allow it to be easily processed by mixing, milling, extrusion or injection. The physical characteristics of cured polymer, i.e., mechanical strength and modulus, will depend on the rate of cure and the nature of the cured state achieved. It is well known that favorable molecular weight distribution (MWD) results in polymers which can have both faster cures and better processing characteristics. The optimum combination of these properties is achieved where the polymers have a particular molecular weight distribution and a particular intermolecular compositional distribution.

A significant amount of effort has been expended by the polymer industry in an attempt to produce such ethylene-propylene polymers with unique molecular weight distributions. Generally, these efforts have been directed toward physical blends of polymers having different MWD, selecting the proper catalyst system or by sequential polymerization in a multiple reactor system. For example, a polymerization is carried out in a first reaction stage to produce a polymer of a given MWD and composition with a subsequent polymerization in a second reactor stage to produce a polymer of a different MWD from that of the first stage and, if desired, of a different monomer composition.

British Pat. No. 1,233,599 is illustrative of this two stage polymerization process. While copolymers of ethylene are disclosed, the examples and disclosure are directed toward polyethylene homopolymers and crystalline copolymers, e.g., 95% ethylene. The preferred catalysts are vanadium compounds such as vanadyl halide, vanadium tetrachloride or vanadium tris-(acetylacetonate) in conjunction with an aluminum compound, e.g., $Br_2AlCH_2Br_2$. The different MWDs are obtained by using differing amounts of hydrogen as a chain transfer agent in the first and second stages of polymerization.

U.S. Pat. No. 4,078,131 discloses an ethylene-propylene rubber composition having a bimodal distribution in molecular weights comprising two polymer fractions each having a wide distribution of molecular weights and a monomer composition different from that of the other principal fraction. The polymers are further characterized in that they are formed of: (a) a first principal fraction comprising from about 30% to about 85% (by weight referred to the total weight of elastomers) of molecular weight fractions having an intrinsic viscosity distribution of from about 0.2 to about 3, and an average intrinsic viscosity of about 0.8 to 1.5, an average propylene content between about 36 to about 52% by weight, and a termonomer content of between 0% and about 5%; and of (b) a second fraction comprising about 70% to about 15% of weight of molecular weight fractions having an intrinsic viscosity distribution from about 3 to about 15, and average intrinsic viscosity of about 3.5 to about 7, and average propylene content of between about 26% to about 32% by weight and a termonomer content of about 0 to about 5%. The polymers disclosed have a higher ethylene content in the higher molecular weight fractions of the material.

The polymers are prepared by carrying out polymerization in two separate reactors connected in series. The catalyst systems utilized include organic and inorganic component of a transition metal of Group 4A to 8A of the Mendeleev periodic table of the elements, e.g., $VOCl_3$, $VCl_4$, vanadium esters and acetyl aetonates. Co-catalysts include organoaluminum compounds or mixtures of compounds, e.g., aluminum alkyls.

U.S. Pat. No. 3,681,306 discloses a two stage polymerization process for the preparation ethylene-propylene co- and terpolymers. In one embodiment the first stage is a "pipe reactor" and the second stage is a back-mixed pot reactor. The polymerization is carried out so that the average ethylene/alpha olefin ratio in one state is at least 1.3 times the average ratio of the other stage. Any of the coordination catalysts known to be useful in producing EPDM polymers is said to be effective for the process.

U.S. Pat. No. 4,259,468 discloses a broad molecular weight ethylene-propylene-diene rubber prepared using as a catalyst (a) the alcohol reaction product of vanadium oxytrichloride and (b) a mixture of aluminum sesquichloride and ethylaluminum dichloride. The polymer is characterized in that the higher molecular weight fraction contains a larger proportion of the diene than does the lower molecular weight fraction. The polymer has an intrinsic viscosity of about 1.0 to about 6.0 dl/g and a weight average molecular weight/number average molecular weight ratio of about 3 to about 15.

U.S. Pat. No. 4,306,041 discloses a method of manufacture for EPDM type terpolymers which utilizes a two stage polymerization process. Substantially all of the non-conjugated diene monomer is fed to the first stage thereby producing a polymer having a non-uniform diene content.

It has been shown that selecting the appropriate support for titanium based Ziegler catalysts can result in the single stage polymerization of ethylene propylene polymer have a broad molecular weight distribution, e.g., $TiCl_4$ supported on aluminosilicate; see A. G. Rodinov, et al, Vysokomal, soyed, A23: No. 7, 1560–1567, 1981.

A 1962 study alleges that soluble Ziegler catalysts tend to give EP polymers having uniform monomer distribution as a function of molecular weight. Heterogeneous $TiCl_4$-$AlEt_3$, on the other hand, gives a broad distribution. See G. W. Phillips and W. L. Carrick, "Transition Metal Catalysts, IX. Random Ethylene-Propylene Copolymers with Low Pressure Polymerization Catalysts," *J. Am. Chem. Soc.*, 84, 920–925, 1962.

In the polymerization of ethylene-propylene polymers it has been demonstrated that different catalysts give different EP reactivity ratios. See G. Natla, G. Crespi, A. Valvassori, G. Sartori, *Rubber Chemistry and Technology*, 36 1608 (1963).

C. Cozewith and G. Ver Strate, *Macromolecules*, 4, 482 (1971). Cozewith and Ver Strate have determined the $R_{Et}$ and $R_{Pr}$ for the system $VOCl_3$/EASC to be 10.1 and 0.025 respectively. A co-worker in an unpublished memorandum disclosed that the $R_{Et}$ and $R_{Pr}$ for $VCl_4$/EASC was found to be 3.91 and 0.224 respectively.

SUMMARY OF THE INVENTION

It has surprisingly been found that by properly selecting the composition and inter-molecular compositional distribution with respect to ethylene and diene content and the molecular weight and molecular weight distribution, ethylene-propylene-diene terpolymers can have both improved processing properties and compound vulcanizate physical properties. The lower molecular weight fractions of $10^4$ to about $5 \times 10^5$ have at least 2 times the diene content of the higher molecular weight fractions and an ethylene content of 30–80 wt. %. The higher molecular weight fractions of $2 \times 10^5$ to about $10^7$ have a higher ethylene content than the lower molecular weight fractions and are less than 90 wt. % ethylene.

DETAILED DESCRIPTION

The properties of EPDM which are important in its application include easy fabrication and excellent physical characteristics of the cured polymer. Fabrication is commonly used to describe a collection of polymer properties which allow it to be formed by a process of extrusion or injection with great rapidity and/or with little expenditure of mechanical work. Other important fabrication operations are mixing with fillers and process oils and the manipulation of the unvulcanized compounded polymer. The latter requires that the polymer have the proper unvulcanized strength. Physical characteristics of the cured polymer describe the mechanical strength and modulus of the final product which depend on the level and nature of crosslinking achieved in the polymer. The molecular characteristics of the polymer which affect the fabrication and physical properties include composition, molecular weight and molecular weight distribution. At any given composition EP polymers with a high molecular weight and a narrow molecular weight distribution cure efficiently and have therefore excellent physical properties while those of a lower molecular weight and broader molecular weight distribution are better processing. This is because the perfection of the vulcanized physical properties depend on number average molecular weight while rheological characteristic important for processing depend on higher molecular weight moments. At a constant composition (wt% ethylene, diene), it is difficult to optimize these parameters so that the resulting polymer has a combination of good cure and fabrication characteristics. Although it is possible to relax these restrictions by changing the composition, such changes also affect other properties which are affected by ethylene content (low temperature properties) and ENB content (i.e., gloss transition temperature and final cure state).

These restrictions place theoretical limits on our ability to develop polymers which have superior cure and processing characteristics. The novelty of this invention is that we have discovered that by introducing intermolecular compositional distribution superimposed on a skewed molecular weight distribution, it is possible to produce polymers which are significantly easier to fabricate and/or give better vulcanizate properties than polymers which we have so far encountered.

The inter-molecular composition distribution we have indicated is a difference in ethylene and diene content among different polymer chains. The composition of polymer molecules controls their microstructure and bulk properties; we seek to have enhancement of the latter by incorporating in the same macroscopic sample of the polymer at least two populations of polymer chains with distinctly different compositions. Molecular weight distribution refers to the characteristics of the polymerization reaction and describes the observation that all the polymer chains made in a single polymerization step in a continuous flow stirred tank reactor (CFSTR) do not have the same molecular weight.

The distribution of the fraction of polymer existing in chains of a given molecular weight versus the molecular weight of the chains is commonly referred to as the molecular weight distribution. This distribution can be different depending on the nature of the polymerization catalyst and the polymerization process. Most commonly the distribution is measured by $M_w/M_n$ where $M_w$ is the weight average molecular weight of the polymer while the $M_n$ is the number average molecular weight. In the common case of a single catalyst species polymerizing under steady state conditions in a single CFSTR reactor, the expected value of $M_w/M_n$ is 2.0. The novelty of this invention is the superposition of an intermolecular compositional distribution on a skewed molecular weight distribution. This molecular weight distribution contains a larger amount of the high molecular weight fraction than would be expected from the polymerization in a single CFSTR reactor with a single catalyst species; additionally this higher molecular weight part has a higher ethylene content and lower diene incorporated than the bulk of the polymer. Additionally, low molecular weight fractions are not introduced thereby retaining a high number average molecular weight in the polymer.

Intermolecular compositional distribution is a microscopic property of the polymer and methods have been developed to determine its existence. The original method as described by Natta deals with fractional precipitatation of the dissolved polymer in a solvent/nonsolvent mixture. In this method a solution of the polymer in a suitable solvent such as hexane is treated with a nonsolvent such as isoproponal or acetone until a fraction is precipitated. The process is repeated with the remainder of polymer in solution to afford several different precipitated fractions. The precipitate is isolated and analyzed for compositional by appropriate spectroscopic techniques. This method is somewhat inaccurate in that molecular weight and composition effects are difficult to separate by this technique; polymer of high ethylene content, low molecular weight and low ethylene/high molecular weight are precipitated simultaneously. Out approach in establishing the intramolecular compositional distribution has been different because we have relied on the reactivity ratio and the monomer concentration of the polymerization system to produce and measure the compositional distribution—this is independent of molecular weight or molecular weight distribution. Reactivity ratio is the differential reactivity of the different monomers towards incorporation into the EPDM polymer and is constant for any given catalyst system. Thus under conditions of the same relative steady state concentration of monomers in a CFSTR the polymer made with a given catalyst system contains the same relative concentrations of incorporated monomers—irrespective of the molecular weight using a catalyst that involves primarily a single reactive specie. Conversely, changes in the relative concentration of monomers leads to changes in the composition of the polymer produced. In these synthetic procedures the polymers of different composition are produced by changing the steady state concentrations of monomers in the polymerization reactors.

The inter-molecular compositional distribution of the polymer of this invention consists both of differences in ethylene content and diene content, and the polymer, in general, consists of two fractions which are differentiated in molecular weight and composition. The predominant fraction which is between 95–60% of the total polymer, more preferably between 90–75%, consists of a narrow molecular weight distribution polymer as would be obtained by Ziegler polymerization by a single catalyst species in a CFST reactor. This polymer has a normal molecular weight of $10^4$ to $5 \times 10^5$ and a Mooney viscosity expressed at 127° C. of $M_L(1+8)$ between 5 and 200; more preferably between 20 to 150. This first polymer fraction has an MWD that is about a most probable distribution. While the first fraction may have a higher molecular weight fraction skewing the distribution to the higher molecular weight, it may not have a lower molecular weight fraction which could skew the distribution toward the lower molecular weight fractions. The remaining fraction of the polymer which therefore comprises 5–40%; preferably 10–35% of the total is of a much higher molecular weight with a molecular weight of $2 \times 10^5$ to $10^7$ and a Mooney viscosity expressed at 127° C. of $M_L(1+8)$ between 100 and 50,000; more preferably beween 300 and 5000. The molecular weight distribution of each of the fractions as defined by the ratio Mw/Mn is about 2–6.5, preferably 2–4.5, more preferably 2–3.5. These bimodal molecular weight distribution polymers have a superimposed bimodal distribution of composition. In general, the polymer with the lower molecular weight has a lower ethylene and higher diene content than the bulk average. Typical ethylene contents are 30–80% by weight with particular preference for 40–75% by weight. The diene content of this fraction is between 1.5–10% by weight, preferably about 2.0 to about 0.7%; more preferably about 2.5 to about 5.6 wt %, e.g., 3.5 wt. %. The minor fraction of the polymer with the higher molecular weight has a higher ethylene content and lower diene content than the average. Typical ethylene contents are 40–90% by weight with particular preference for 50–90% by weight. The diene content of this fraction is between 0–5% by weight, preferably about 1.0 to about 3.5 wt. %; more preferably about 1.5 to 2.5 wt. %. The difference in compositions of the two fractions, expressed as higher molecular weight fraction minus the lower molecular weight fraction is an important criteria for the application of this invention and for ethylene content −5% to +60% with particular preference for +10% to +25% is applicable.

The ratio of diene in the lower molecular weight fraction to the higher molecular weight fraction must be at least 2/1. It is advantageous to have this ratio as high as practical, e.g., at least 2.5/1; preferably at least 3.5/1; more preferably at least 5/1. Where the high molecular weight fraction has no diene the ratio is of course infinity.

In EPDM higher alpha-olefins may be used rather than propylene and those having 3 to 8 carbon atoms are preferred. The most preferred alpha-olefins are those having 3 to 6 carbon atoms.

The dienes suitable for use in this invention are non-conjugated dienes where only a single double bond is polymerizable while the second is free for subsequent vulcanizations. Additionally, the preferred dienes are characterized by having high monomer incorporation during polymerization with the particular Ziegler-Natha catalyst system used. Bridged ring dienes such as alkenyl, alkylidene, cycloalkenyl and cycloalkylidene norbornenes are preferred; particularly preferred is 5-ethylidene-2-norbornene (ENB) and methylene norbornene.

These polymers have been shown to have superior processing and/or better curing than comparable polymers of the same average composition but without the bimodal molecular weight/composition distribution. The synthesis of these polymers is a related but somewhat separate subject and they are made either by controlled multi-species caalysts in a single reactor, polymerization in one or more reactors in series or parallel reactor as defined by the prior art.

In one embodiment the polymerization process is carried out in the manner of the process disclosed in U.S. Pat. No. 4,078,131 except that 5-ethylidene-2-norbornene is used rather than a linear non-conjugated diene. The compositions can of course be prepared by blending polymer fractions of the appropriate compositions which have been made by known techniques.

The Mooney viscosity of the higher molecular weight fraction is not easily measured directly since polymers of the preferred molecular weights are very viscous even at elevated temperatures. Therefore, the Mooney viscosities are calculated from the equation: log $ML_T = (f_L \times ML_L) + (f_H \times ML_H)$ where $ML_T$, $ML_L$ and $ML_H$ are the Mooney viscosity of the total polymer and the low and high molecular weight fractions, respectively and $f_L$ and $f_H$ are the weight fractions of the low and high molecular weight fractions of the polymer.

Polymer composition, molecular weights and molecular weight distributions are determined by methods well known in the art.

The following Examples illustrate the invention

EXAMPLE I

The EPDM polymer in this example were synthesized in two CSTR connected in series. Hexane used as a solvent and $VCl_4$ and ethyl aluminum sesquechloride at 6/1 Al to V and ammonia at a $NH_3$ to V ratio of 1.5 was as the catalyst system. Provision was made to feed monomers to both reactors and the heat of polymerization was controlled by heat exchange with the polymerization fluid and by cooling the solvent and monomer feeds.

In a single CSTR this catalyst system and polymerization process results in a EPDM that exhibits substantially a most probably molecular weight distribution with some higher molecular weight fractions being produced. No additional low molecular weight modes could be detected by gel permeation chromatography.

Process conditions were controlled to produce EPDM with the molecular weight distribution molecular weight, inter-molecular compositional distribution and composition necessary to practice the present invention. A CSTR control polymer and polymers having high and low molecular weight modes with different characteristics are shown in Table I.

The compound processing, cure rate properties and physical properties are shown in Table II.

When compared with the control polymer the polymers of this invention have a large decrease in bulk viscosity on compounding with carbon black and process oil as can be seen by examining the polymer Mooney viscosity at 127° C. and the compound Mooney viscosity at 100° C.

Extrusion rates are faster for the polymers of this invention when compared to the CSTR polymer. The improved extrusion rate at similar compound Mooney viscosity is believed to be due to the higher unvulcanized strength of the improved copolymers resulting in better feeding characteristics in the barrel of the extruder.

The cure rate of the improved polymers is superior to the control as seen from the shape of the cure rate curve determined under standard conditions in a Monsanto Rheometer at 150° C. The state of cure is also superior as shown by the $M_H$-$M_L$ (delta between the lowest and maximum on the Monsanto Rheometer cure curve.)

Vulcanizate physical properties are greatly improved over the control polymer. The 300% modulus is significantly higher as well as the tensile strength at failure.

EXAMPLE II

In this example four samples of EP polymers of the same average ethylene and ENB content and the same measured Mooney viscosity were made by hexane solution blending. The high molecular weight polymer has a $Mw=2.2\times10^6$ with a calculated $M_L(127°$ C.) of 2900. The composition of this polymer was 68% ethylene and 1.3% ENB. Various weight fractions of this polymer, as shown in Table III, were added to different polymers of a much lower molecular weight but of a narrow molecular weight distribution to produce four samples, A, B, C and D, where were used for evaluation. These samples are essentially identical in all average composition and viscosity parameters but have a predetermined compositional distribution superimposed on a broadened molecular weight distribution. These four samples were evaluated by stress strain measurements and the results shown in Table IV. It is evident that inclusion of 10–15% of the high molecular weight component provides a substantial increase in the unvulcanized mechanical properties of these polymer which lead to better processibility and unvulcanized tensile strength. The properties of cured rubber were examined and the data shows that there is very little difference between these four polymers.

While 1–4 hexadiene is a useful diene in the practice of this invention, the polymers of this invention cannot be prepared using conventional catalysts and a series reactor polymerization technique as described in U.S. Pat. No. 4,078,131. This is so because, using conventional catalysts, only about 15 wt. % of the diene is incorporated into the polymer in the first polymerization stage. As a consequence each of the polymer fractions have approximately equal diene content. As has been disclosed the polymer compositions of this invention can, of course, be prepared by blending high and low molecular weight fractions which meet the composition and compositional distribution disclosed herein.

TABLE I

|  | Single CSTR Control | A | B | C | D | E |
|---|---|---|---|---|---|---|
| Mooney viscosity @ 127° C. $ML_T/ML_LML_H$ | 47 | 115/45/2300 | 78/38/1616 | 82/34/1560 | 80/40/600 | 89/35/890 |
| Wt. % Ethylene Polymer/Low Mw/High Mw | 66 | 50/44/71 | 56/53/72 | 61/58/72 | 63/55/85 | 66/60/82 |
| Wt. % ENB Polymer/Low Mw/High Mw | 3.0 | 4.0/4.7/1.8 | 3.7/4.5/0.5 | 2.8/3.3/1.4 | 2.5/3.2/0.6 | 3.2/3.8/2.0 |
| Wt. Fraction of Low Mw | — | 0.76 | 0.81 | 0.77 | 0.75 | 0.71 |

TABLE II

| Compound Properties[1] | Single CSTR Control | A | B | C | D | E |
|---|---|---|---|---|---|---|
| Mooney Viscosity at 100° C. | 49 | 57 | 49 | 54 | 52 | 52 |
| Monsanto Rheometer at 150° C. | | | | | | |
| $M_H$-$M_L$ | 17.5 | 20.3 | 19.7 | 19.1 | 19.9 | 20.3 |
| Slope of cure curve | 1.8 | 2.6 | 2.6 | 2.2 | 2.3 | 2.5 |
| Physical Properties after vulcanization at 150° C. for 1 hour | | | | | | |
| Tensile Strength, psi | 1400 | 1900 | 1820 | 1770 | 1720 | 1800 |
| 30% modulus, psi | 900 | 1280 | 1290 | 1250 | 1270 | 1275 |
| Elongation to Failure, % | 620 | 530 | 480 | 540 | 540 | 590 |
| Extrusion in Garvy Extruder g./min. | 82 | 94 | 105 | — | — | — |

[1]Polymer - 100 pts., carbon black N650 - 140 pts., Flexon 815 process oil - 85 pts., Zinc oxide - 5 pts., stearic acid - 1 pt., Dyphene 8340 - 5 pts., MethylTriads - 0.5 pts., EthylTriads - 0.5 pts., Santocure NS - 2.4 pts., and sulfur - 0.7 pts.

TABLE III

| POLYMER | MAJOR FRACTION* | | | | MINOR FRACTION* | TOTAL | | | |
|---|---|---|---|---|---|---|---|---|---|
|  | C$_2$ % | EMB % | ML(1 + 8) | Mw/Mm | Wt % | C$_2$ % | EMB % | ML(1 + 8) | Mw/Mm |
| A | 53 | 3.5 | 64 | 2.1 | 0 | 53 | 3.5 | 64 | 2.1 |
| B | 50 | 3.4 | 64 | 2.0 | 5 | 51 | 3.3 | 65 | 2.3 |
| C | 53 | 3.5 | 47 | 2.0 | 9 | 53 | 3.5 | 64 | 3.0 |

TABLE III-continued

| POLYMER | MAJOR FRACTION* | | | | MINOR FRACTION* | TOTAL | | | |
|---|---|---|---|---|---|---|---|---|---|
| | C$_2$ % | EMB % | ML(1 + 8) | Mw/Mm | Wt % | C$_2$ % | EMB % | ML(1 + 8) | Mw/Mm |
| D | 53 | 3.5 | 34 | 2.1 | 16 | 54 | 3.3 | 65 | 3.7 |

*Minor Fraction is 68% C$_2$, 1.3% ENB and calculated ML(1 + 8) at 2900 at 127° C.

TABLE IV

STRESS-STRAIN DATA FOR BLENDED POLYMERS

| POLYMER | BLEND RATIO | STRESS (psi) | at | STRAIN (% elongation) |
|---|---|---|---|---|
| A | 100:0 | 60 | at | 230 (Break) |
| B | 95:5 | 70 | at | 2000 |
| C | 91:9 | 150 | at | 2000 |
| D | 84:16 | 340 | at | 2000 |

We claim:

1. An ethylene-propylene polymer composition comprising (1) a first polymer fraction having a molecular weight of about $10^4$ to about $5 \times 10^5$, an ethylene content of about 30 to about 80 wt.%, and a diene content of about 1.5 to about 10 wt.%; and (2) a second polymer fraction having a molecular weight of about $2 \times 10^5$ to about $10^7$, an ethylene content of about 45–90 wt.%, and a diene content of 0 to about 5 wt.%; said second fraction having a higher molecular weight and higher ethylene content than said first fraction; the weight ratio of diene in the first fraction to diene in the second fraction being at least 2/1, and the molecular weight distribution (Mw/Mn) of each of the fractions being, independently, about 2–6.5.

2. The composition according to claim 1 wherein the diene content of the first fraction is about 2.0 to about 7.0 wt.% percent.

3. The composition according to claim 1 wherein the diene content of the first fraction is about 2.5 to about 5 wt. %.

4. The composition according to claim 1 wherein the diene content of the second fraction is about 0.1 to about 3.5 wt. %.

5. The composition according to claim 1 wherein the diene content of the second fraction is about 0.5 to about 2.5 wt.%.

6. The composition according to claim 1 wherein the weight ratio of diene in the first fraction and diene in the second fraction is at least 2.5/1.

7. The composition according to claim 6 wherein the weight ratio is at least 3.5/1.

8. The composition according to claim 6 wherein the weight ratio is at least 10/1.

9. The composition according to claim 1 wherein the ethylene content of the first fraction is about 40 to about 75 wt. %.

10. The composition according to claim 1 wherein the ethylene content of the second fraction is about 50 to about 90 wt. %.

11. The composition according to claim 1 wherein the Mw/Mn of each of the fractions is, independently, about 2.0 to about 4.5.

12. The composition according to claim 1 wherein the Mw/Mn of each of the fractions is, independently, about 2 to about 3.5.

13. The composition according to claim 1 wherein the high molecular weight fraction comprises about 5–40 wt. % of the composition.

14. The composition according to claim 1 wherein the high molecular weight fraction comprises about 10–35 wt. % of the composition.

15. The composition according to claim 1 wherein the diene is 5-ethylidene-2-norbornene (ENB).

16. The composition according to claim 1 wherein the diene is methylene norbornene.

* * * * *